US012610445B2

(12) United States Patent
Hutson et al.

(10) Patent No.: US 12,610,445 B2
(45) Date of Patent: Apr. 21, 2026

(54) DISTRIBUTED COMPUTING ENVIRONMENT VIA A PLURALITY OF REGULARLY SPACED, AERIALLY MOUNTED WIRELESS SMART SENSOR NETWORKING DEVICES

(71) Applicant: UBICQUIA, INC., Fort Lauderdale, FL (US)

(72) Inventors: Bradford Brian Hutson, Vero Beach, FL (US); Ian B. Aaron, Fort Lauderdale, FL (US); Ronald B. Zimmerman, III, Wellington, FL (US)

(73) Assignee: Ubicquia, Inc., Fort Lauderdale, FL (US)

( * ) Notice: Subject to any disclaimer, the term of this patent is extended or adjusted under 35 U.S.C. 154(b) by 0 days.

(21) Appl. No.: 18/751,233

(22) Filed: Jun. 22, 2024

(65) Prior Publication Data

US 2024/0349413 A1     Oct. 17, 2024

Related U.S. Application Data

(63) Continuation of application No. 16/960,514, filed as application No. PCT/US2019/012787 on Jan. 8, 2019, now abandoned.

(Continued)

(51) Int. Cl.
H05B 47/00        (2020.01)
H04B 10/116       (2013.01)

(Continued)

(52) U.S. Cl.
CPC ......... H05B 47/195 (2020.01); H04B 10/116 (2013.01); H05B 45/12 (2020.01);

(Continued)

(58) Field of Classification Search
None
See application file for complete search history.

(56) References Cited

U.S. PATENT DOCUMENTS

| | | | | |
|---|---|---|---|---|
| 2009/0066258 A1* | 3/2009 | Cleland | .................... | H02J 3/14 |
| | | | | 315/158 |
| 2010/0162261 A1* | 6/2010 | Shashidhara | ......... | G06F 9/5088 |
| | | | | 713/400 |

(Continued)

FOREIGN PATENT DOCUMENTS

| | | | | | |
|---|---|---|---|---|---|
| DE | 102014204556 | * | 9/2014 | ............ | G09F 21/04 |
| DE | 102014204556.8 A1 | | 9/2014 | | |
| EP | 2709428 A2 | | 3/2014 | | |

OTHER PUBLICATIONS

Communication pursuant to Article 94(3) EPC in connection with European Patent Application No. 19706048.6 dated Feb. 24, 2022, 5 pages.

*Primary Examiner* — Nathan M Cors
(74) *Attorney, Agent, or Firm* — Daniel C. Crilly

(57) ABSTRACT

A networking device includes a light sensor, a processor module, a communication module, and a connector. The processor module is arranged to provide a light control signal based on at least one ambient light signal generated by the light sensor, and to obtain a distributed computing result based on a distributed computing task. The communication module is arranged to receive the distributed computing task and to transmit the distributed computing result according to a data communication standard. The connector may be compliant with ANSI C136.41-2013. The processor module may be arranged to provide the light control signal based on the distributed computing result, or a received message that is generated based on a plurality of distributed computing results.

12 Claims, 7 Drawing Sheets

Related U.S. Application Data

(60) Provisional application No. 62/730,488, filed on Sep. 12, 2018, provisional application No. 62/614,918, filed on Jan. 8, 2018.

(51) Int. Cl.

| | | |
|---|---|---|
| *H05B 45/12* | (2020.01) | |
| *H05B 47/11* | (2020.01) | |
| *H05B 47/19* | (2020.01) | |
| *H05B 47/195* | (2020.01) | |
| *H05B 47/105* | (2020.01) | |
| *H05B 47/185* | (2020.01) | |

(52) U.S. Cl.
CPC ............. *H05B 47/11* (2020.01); *H05B 47/19* (2020.01); *H05B 47/105* (2020.01); *H05B 47/187* (2024.01)

(56) References Cited

U.S. PATENT DOCUMENTS

| | | | | |
|---|---|---|---|---|
| 2010/0271178 A1* | 10/2010 | Ahmad | .................... | H04Q 9/00 |
| | | | | 340/815.45 |
| 2014/0266799 A1 | 9/2014 | Liu et al. | | |
| 2016/0295665 A1 | 10/2016 | Aggarwal et al. | | |
| 2020/0403693 A1* | 12/2020 | Oren-Pines | ............ | H04B 10/27 |

\* cited by examiner

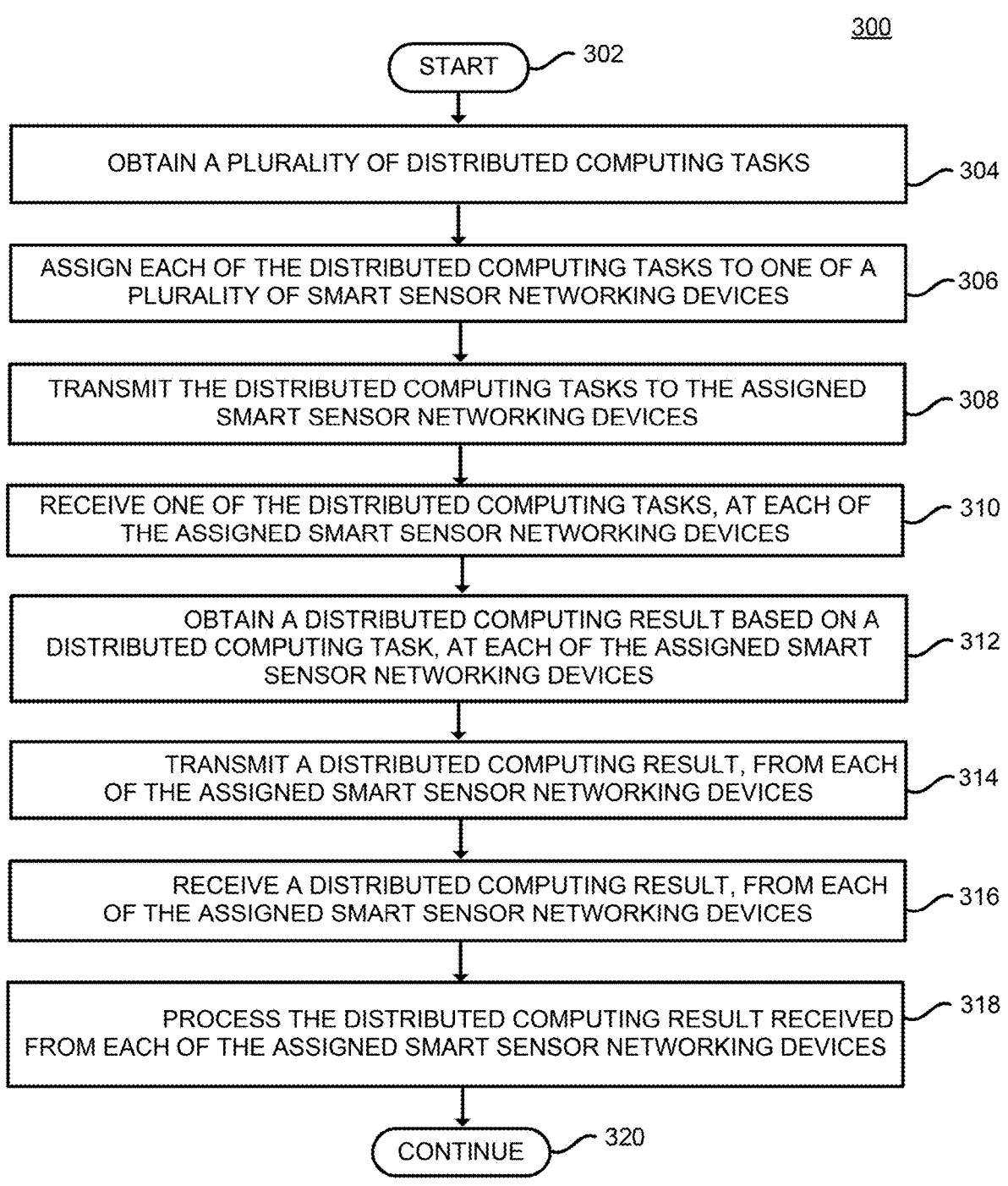

300

START — 302

OBTAIN A PLURALITY OF DISTRIBUTED COMPUTING TASKS — 304

ASSIGN EACH OF THE DISTRIBUTED COMPUTING TASKS TO ONE OF A PLURALITY OF SMART SENSOR NETWORKING DEVICES — 306

TRANSMIT THE DISTRIBUTED COMPUTING TASKS TO THE ASSIGNED SMART SENSOR NETWORKING DEVICES — 308

RECEIVE ONE OF THE DISTRIBUTED COMPUTING TASKS, AT EACH OF THE ASSIGNED SMART SENSOR NETWORKING DEVICES — 310

OBTAIN A DISTRIBUTED COMPUTING RESULT BASED ON A DISTRIBUTED COMPUTING TASK, AT EACH OF THE ASSIGNED SMART SENSOR NETWORKING DEVICES — 312

TRANSMIT A DISTRIBUTED COMPUTING RESULT, FROM EACH OF THE ASSIGNED SMART SENSOR NETWORKING DEVICES — 314

RECEIVE A DISTRIBUTED COMPUTING RESULT, FROM EACH OF THE ASSIGNED SMART SENSOR NETWORKING DEVICES — 316

PROCESS THE DISTRIBUTED COMPUTING RESULT RECEIVED FROM EACH OF THE ASSIGNED SMART SENSOR NETWORKING DEVICES — 318

DISTRIBUTED COMPUTING ENVIRONMENT VIA A PLURALITY OF REGULARLY SPACED, AERIALLY MOUNTED WIRELESS SMART SENSOR NETWORKING DEVICES

CROSS-REFERENCE TO RELATED APPLICATIONS

The present application is a continuation of U.S. application Ser. No. 16/960,514, which was filed on Jul. 7, 2020, and is incorporated herein in its entirety by this reference. application Ser. No. 16/960,514 is a U.S. national phase application under 35 U.S.C. § 371 of PCT Application No. PCT/US2019/012787, which was filed on Jan. 8, 2019, and is incorporated herein in its entirety by this reference. PCT Application No. PCT/US2019/012787 claims the benefit of and priority upon U.S. Provisional Patent Application Ser. No. 62/730,488, which was filed on Sep. 12, 2018, and is incorporated herein in its entirety by this reference. PCT Application No. PCT/US2019/012787 also claims the benefit of and priority upon U.S. Provisional Patent Application Ser. No. 62/614,918, which was filed on Jan. 8, 2018, and is incorporated herein in its entirety by this reference.

BACKGROUND

Technical Field

The present disclosure generally relates to devices having both network capabilities and light control capabilities integrated therein. More particularly, but not exclusively, the present disclosure relates to a distributed computing environment that includes a plurality of aerially mounted devices having both network capabilities and light control capabilities integrated therein.

Description of the Related Art

Conventionally, a light control device may be attached to a light fixture of a street light that is mounted on a light pole. The light control device monitors ambient lighting conditions and provides control signals that are used to turn the street light on and off based on the ambient lighting conditions. For example, when ambient lighting is below a first threshold, the light control device outputs a control signal that causes the street light to turn on (i.e., emit visible light). Similarly, when ambient light is above a second threshold, the light control device outputs a control signal that causes the street light to turn off (i.e., not emit visible light). The light control device may include a connector that complies with a standard, and the light fixture may include a corresponding connector that complies with the same standard.

The American National Standards Institute (ANSI) is a standards body that publishes and promotes standards for certain electrical equipment, mechanical equipment, and electromechanical equipment in use today. ANSI is a private, non-profit organization that oversees and administers development of voluntary consensus standards for products, services, processes, systems, protocols, and the like. It is also known that ANSI coordinates at least some U.S. standards with at least some international standards, which permits products manufactured according to U.S. standards to be used in other non-U.S. countries in the world.

Various standards developed by organizations, government agencies, consumer groups, companies, and others are accredited by ANSI. These standards are developed and promoted to provide consistent characteristics, definitions, terms, testing, implementation, and performance in products that are compliant with a given standard.

The National Electrical Manufacturers Association (NEMA) is one such organization that develops, promotes, or otherwise partners with ANSI. According to publicly available information, the NEMA is the largest trade association of electrical equipment manufacturers in the United States. NEMA is a consortium of several hundred member companies that manufacture products used in the generation, transmission, distribution, control, and end use of electricity. These products are used in utility, industrial, commercial, institutional, and residential applications including lighting products installed over roadways, parking lots, constructions sites, pedestrian malls, manufacturing floors, and the like.

NEMA publishes standards documents, application guides, white papers, and other technical papers. NEMA also publishes and promotes several hundred technical standards for electrical enclosures, controllers, communication protocols, motors, wire, plugs, and receptacles among other equipment. Certain ones of NEMA's American National Standards directed toward Roadway and Area Lighting Equipment are referred to as ANSI C136 standards. At least one NEMA standard, referred to as ANSI C136.41, is directed to external locking type photo-control devices for street and area lighting.

In conventional distributed computing environments, such as "cloud" computing systems operated by Microsoft Corporation and Amazon.com Corporation multiple processors are linked together, and computing tasks are shared among the processors. For example, the processors may be included in processing devices that are geographically dispersed. Such processing devices must have network capabilities so that the processors can be linked together and tasks can be shared among the processors. Conventional light control devices do not have network capabilities. Accordingly, conventional light control devices are not suitable for use as processing devices in distributed computing environments.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

According to the present disclosure, processing devices having both network capabilities and light control capabilities integrated therein are mountable on light fixtures of street lights. The processing devices are arranged to cooperate and share tasks in order to perform common purpose processing in a distributed computing environment.

In a first embodiment, a networking device may be summarized as including: a light sensor; a processor module arranged to provide a light control signal based on at least one ambient light signal generated by the light sensor, and to obtain a distributed computing result based on a distributed computing task; a communication module arranged to receive the distributed computing task and to transmit the distributed computing result according to a data communication standard; and a connector compliant with a roadway area lighting standard promoted by a standards body.

The processor module may be arranged to obtain the distributed computing result based on the distributed computing task in response to determining that a utilization of the processor module is below a threshold value. The communication module may be arranged to receive the distributed computing task and to transmit the distributed computing result using a powerline. The communication module may be arranged to receive the distributed computing task and to transmit the distributed computing result using a cellular-based network controlled by a mobile network operator (MNO). The communication module may be arranged to receive the distributed computing task and to transmit the distributed computing result according to a wireless data communication standard. The communication module may be arranged to receive the distributed computing task and to transmit the distributed computing result using infrared-based communications.

The connector may be compliant with American National Standards Institute (ANSI) C136. The connector may be compliant with ANSI C136.41-2013. The connector may include: at least three pin structures, the at least three pin structures arranged for removable electromechanical coupling to a streetlight fixture administered by a government entity. The streetlight fixture may be elevated between 20 feet and 40 feet above a roadway. The processor module may be arranged to provide the light control signal based on the distributed computing result. The communication module may be arranged to receive a message generated based on the distributed computing result, and the processor module may be arranged to provide the light control signal based on the message generated based on the distributed computing result.

In a second embodiment, a distributed computing system may be summarized as including a plurality of networking devices. Each of the networking devices includes: a light sensor; a processor module arranged to provide a light control signal based on at least one ambient light signal generated by the light sensor, and to obtain a distributed computing result based on a distributed computing task; a communication module arranged to receive the distributed computing task and to transmit the distributed computing result according to a data communication standard; and a connector compliant with a roadway area lighting standard promoted by a standards body.

The communication module of at least some of the networking devices may be arranged to form a mesh network, to receive the distributed computing task, and to transmit the distributed computing result over the mesh network. The processor module of each of the networking devices may be arranged to obtain the distributed computing result based on the distributed computing task in response to determining that a utilization of the processor module is below a threshold value. The communication module of at least one of the networking devices may be arranged to receive the distributed computing task and to transmit the distributed computing result using a powerline, the communication module of at least one of the networking devices may be arranged to receive the distributed computing task and to transmit the distributed computing result using a cellular-based network controlled by a mobile network operator (MNO), the communication module of at least one of the networking devices may be arranged to receive the distributed computing task and to transmit the distributed computing result using a wireless communication standard, and the communication module of at least one of the networking devices may be arranged to receive the distributed computing task and to transmit the distributed computing result using infrared-based communications.

The connector of each of the networking devices may be compliant with American National Standards Institute (ANSI) C136. The connector of each of the networking devices may be compliant with ANSI C136.41-2013. The connector of each of the networking devices may include at least three pin structures, the at least three pin structures being arranged for removable electromechanical coupling to a streetlight fixture administered by a government entity. The streetlight fixture may be elevated between 20 feet and 40 feet above a roadway. The communication module of at least one of the networking devices may be arranged to receive a message generated based on the distributed computing result, and the processor module of the at least one of the networking devices may be arranged to provide the light control signal based on the message.

In a third embodiment, a method performed by a networking device having at least one light sensor and at least one communication module electronically coupled thereto may be summarized as including: controlling a light output of a light source based on at least one ambient light signal generated by the light sensor; receiving a distributed computing task using the at least one communication module; obtaining a distributed computing result based on the distributed computing task; and transmitting the distributed computing using the at least one communication module.

The method may include coupling the networking device to a streetlight fixture via a connector that is compliant with a roadway area lighting standard promoted by a standards body. Also, the method may include obtaining a final result based on a plurality of distributed computing results; generating a message based on the final result; transmitting the message; and controlling the light output of the light source based on the message.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings.

The present invention may be understood more readily by reference to this detailed description of the invention. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

FIG. 4 is a flowchart showing some operations of a system that deploys a plurality of smart sensor networking devices coupled to a plurality of streetlight fixtures;

DETAILED DESCRIPTION

Figures 1A, 1B:
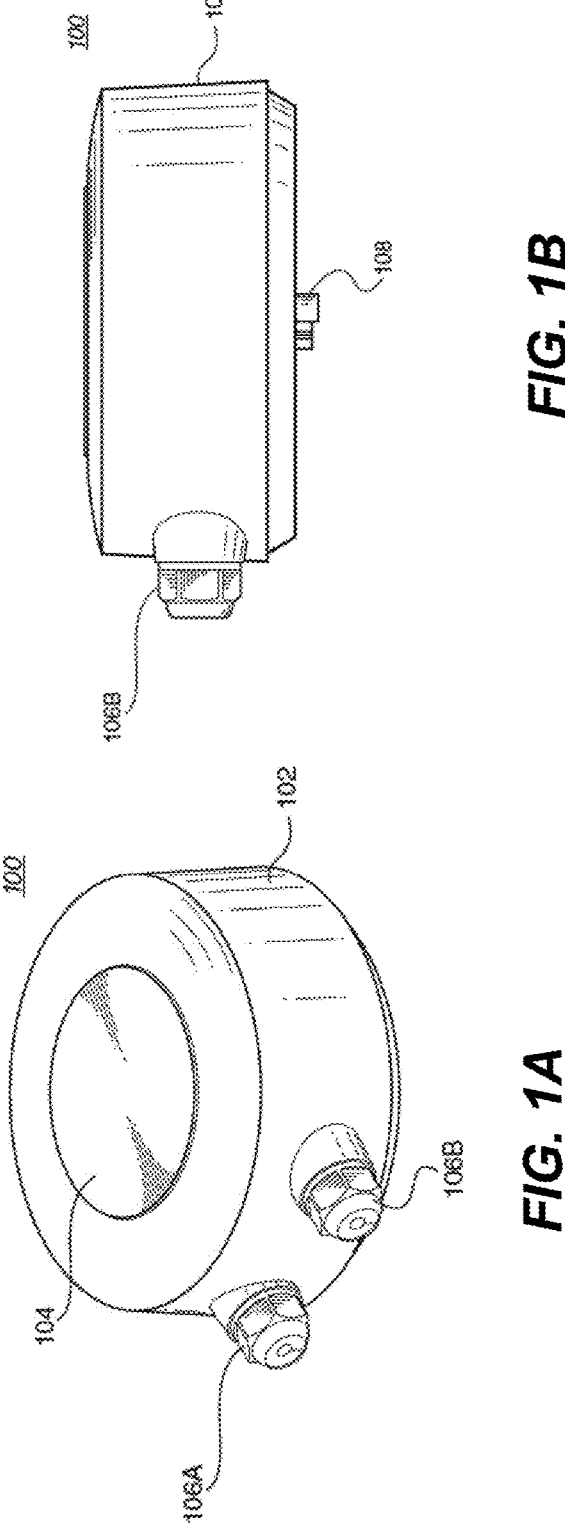
FIG. 1A is a perspective view of a smart sensor networking device embodiment.
FIG. 1B is a right side view of smart sensor networking device embodiment of FIG. 1A.
Figure 2:
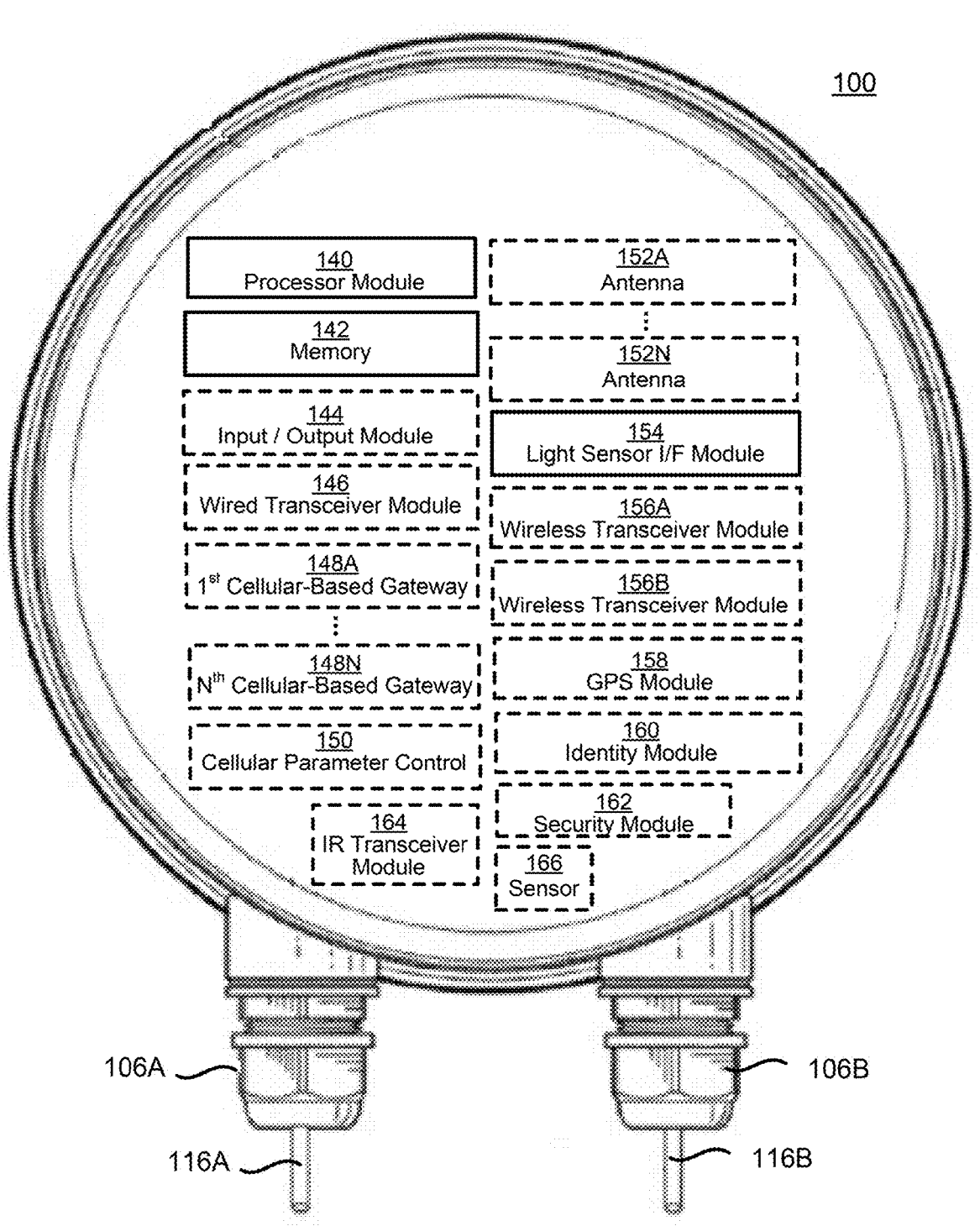
FIG. 2 is a smart sensor networking device block diagram.

Embodiments of the present invention include a wireless smart sensor networking device having a desired shape and electromechanical configuration for mounting on a light pole (see FIGS. 1A, 1*i*, and 2, for example). More particularly, embodiments are arranged with a certain NEMA-style connector integrated on one (e.g., bottom) side, which enables the device to be electromechanically coupled to the top side of a light fixture attached or otherwise integrated into the light pole. Some short exemplary cases are now summarized in a non-limiting descriptive way merely to facilitate understanding of the present disclosure through demonstration of certain embodiments.

Once arranged on a light fixture, the smart sensor networking device is enabled to provide services for the streetlight and is enabled to provide processing in a distributed computing environment. In addition, the smart sensor networking device may be enabled to provide services for mobile devices in proximity to this or other streetlights. In at least some cases, the smart sensor networking device is also arranged to provide still other additional services to one or more third party entities such as utilities, law enforcement, schools, and retail and wholesale businesses.

The smart sensor networking devices described herein will include one or more light sensors. Light sensors detect ambient light in proximity to the streetlight fixture. Using light sensor data, the smart sensor networking devices may control one or more characteristics of light produced by a light source mounted or otherwise integrated in the fixture. The characteristics can include the volume of light output (i.e., lumens or luminous flux), the color or frequency of output light, on/off timing, situational lighting, and the like. In at least some cases, the characteristics of light output from one streetlight fixture are cooperative with characteristics of light output from other (e.g., adjacent) streetlight fixtures.

In addition to certain streetlight control features, the smart sensor networking devices described herein also provide a network over which distributed computing tasks may be transmitted to specific smart sensor networking devices that perform processing and obtain respective distributed computing results based on those tasks. The distributed computing results are routed over the network to a device that processes the results, and possibly generates additional tasks based on the results of the processing.

In addition, the smart sensor networking devices described herein may provide cellular-based wireless communication services to mobile devices. For example, a user holding a smartphone can make or receive a telephone call that passes wireless cellular data through the smart sensor networking device. A mobile network operator (MNO) is an entity that operates a cellular communications system. Mobile network operators may be private entities, public entities such as would be owned and controlled by a government, public-private partnership entities or other entities. A mobile network operator may be a for-profit entity, a non-profit entity, or an entity having some other financial model. As the term is used in the present disclosure, an MNO may also be referred to as a wireless carrier, a cell service provider, a wireless service provider, cellular company, and many other like terms. An MINO provides cellular-based wireless communication services. Using the smart sensor networking devices described herein, a MNO can supplement its cellular-based network with coverage in dense urban areas, areas in geographic regions that are otherwise "dark spots" in its network (e.g., valleys, places in the shadow of natural or manmade structures), in areas that are only periodically high-traffic areas (e.g., stadiums, arenas, show venues), in areas that are temporary (e.g., construction sites, disaster sites), and in other such areas.

In some cases, a single smart sensor networking device may include electronic circuits that provide small cell functionality to two or more MNOs in a single device. For example, in some cases, a single smart sensor networking device may have antennas, transceivers, controllers, and the like that permit two mobile devices provisioned for wireless communications on different cellular-based networks operated by different MNOs to carry on concurrent communication sessions (e.g., phone calls, internet sessions, etc.).

In some cases, MNOs or other entities provide non-cellular wireless services such as "WiFi" services. WiFi services are known to pass communications according to a communications standard administered by the Institute of Electrical and Electronic Engineers (IEEE). One such standard is referred to as IEEE 802.11. These non-cellular wireless communication services may be available to the public free or for a cost. These non-cellular wireless communication services may be available in restaurants, airports, airplanes, public buildings, and the like. Even when these WiFi services are provided by an MNO, these WiFi services are not considered "MNO services" or "cellular-based" services because they are delivered to end user devices using non-cellular frequencies and protocols. What's more, even if some portion of WiFi-delivered data is passed over a cellular-based network (e.g., infrastructure downstream of a WiFi access point couples communications to or through a cellular-based network), these services are still not considered MNO services, cellular-based services, or carrier services because the interface to the end-user device is enabled via WiFi services and not by cellular-based services.

In some cases, the smart sensor networking device provides WiFi access point services to devices that are in proximity to the smart sensor networking device. These WiFi services are distinguished from cellular-based wireless communications because they do not necessarily require MNO provisioning in the manner that a mobile communication device requires provisioning. In these cases, for example, a smart sensor networking device may provide cellular-based service for a specific MNO, and the same smart sensor networking device may also provide WiFi services on behalf of a municipality that wants to provide free or low cost WiFi services to its residents.

The smart sensor networking devices described herein may in some cases be in communication with other smart sensor networking devices or other less sophisticated wireless communication devices. In at least one case, a geographic area has many streetlight poles. Some smart sensor networking devices are mounted on certain ones of the streetlight poles, and other less sophisticated wireless communication devices are mounted on other streetlight poles. These other less sophisticated wireless communication devices can each control characteristics of the light sources integrated on their respective light pole. In this type of system, however, due in part to the wireless capabilities of each device, and due in part to the sophistication of the smart sensor networking device, the lighting of the entire geographic area can be desirably and holistically controlled locally from the smart sensor networking device or remotely from a central site. And in still other systems of this configuration enable the implementation and control of a wide range of sensors, controllers, and other "smart" devices can be integrated to provide MNOs, utilities, government agencies, and the like with a range of services not previously available.

FIG. 1A is a perspective view of a smart sensor networking device 100 embodiment. The smart sensor networking device 100 may be particularly arranged for mounting on a light pole, and even more particularly arranged for mounting on a light fixture (e.g., a luminaire). In these cases, the light fixture in at least some embodiments is aerially mounted between about 20 to 40 feet above the area to be illuminated (e.g., ground level, a roadway, a parking surface, and the like), and the light fixture is mounted on a light pole, a building, or some other structure. In some cases, the light poles, light fixtures, streetlights, buildings, roadways, parking surfaces, or any combination thereof are administered by a government entity.

The smart sensor networking device 100 of FIG. 1A may have a substantially cylindrical form factor wherein a horizontal cross section has a substantially circular shape. Other form factors and horizontal cross sectional shapes are of course considered. In at least some cases, the diameter of the smart sensor networking device 100 is between about six (6) inches and twelve (12) inches. In some embodiments, such as shown in the smart sensor networking device 100 of FIG. 1A, walls of the device are substantially vertical or within about 30 degrees of vertical. In other embodiment, walls of the smart sensor networking device that provide height to the device are segmented such that some portions of the wall are vertical or near-vertical and other portions of the wall structures are closer to horizontal. Many shapes, styles, and dimensions of wall structures have of course been considered. In at least some embodiments, the walls of the smart sensor networking device 100 are formed to create a height of the device between about 2.5 inches and six (6) inches.

The outer housing 102 of the smart sensor networking device 100 of FIG. 1A may be formed of metal, plastic, or some other material. In some cases, the outer housing 102 is painted, bonded, or otherwise coated with a weather-resistant material (e.g., a varnish, an enamel, a fluoropolymer, a powder-coating, or the like). In some cases, the outer housing 102 is arranged in color, shape, material, or some other characteristic to be resistant to birds, insects, or other pests. For example, the outer housing 102 may be mirrored, low friction, spiked, or enabled with vibration, heat, cooling, an audio transducer, or some other anti-pest feature. In at least some embodiments, the outer housing 102 is constructed according to a standard published by the International Electrotechnical Commission (IEC) as Ingress Protection standard IP55. A housing constructed and deployed to IP55 is generally sufficient to resist or otherwise prevent dust and other solid materials from entering the housing and also sufficient to resist or otherwise prevent low pressure liquid (e.g., water) jetted from any direction from entering the housing.

The smart sensor networking device 100 may include a light sensor module 104. The light sensor module 104 of FIG. 1A may or may not include a lens. The light sensor module, which may also be referred to as simply a light sensor, includes a light sensor surface that collects, absorbs, or otherwise detects photons, and an electronic circuit that generates a representation of light that is impacting the light sensor surface. The light sensor module 104 may be arranged to generate at least one light signal (e.g., an ambient light signal, a focused light signal, a data-infused light signal, or the like). Light signals generated by the light sensor module 104 may be digital values between a lower threshold and an upper threshold (e.g., between 0 bits and 1024 bits) that represent the amount of luminous flux (e.g., photons) that strike the light sensor module 104 at a particular point or within a particular time period. A processor-based light control circuit (not shown in FIG. 1A) may be arranged to provide a light control signal based on at least one ambient light signal generated by the light sensor module 104, and in these cases, the light control signal may be used to direct characteristics of light output from a light source integrated in the corresponding light fixture.

In FIG. 1A, the smart sensor networking device 100 includes a pair of twist lock connectors 106A, 106B that provide cable access to the inside of the smart sensor networking device 100. In at least some cases, the twist lock connectors 106A, 106B are water tight, and in these or in other cases, the twist lock connectors 106A, 106B provide strain relief to cables that pass through the connectors. The twist lock connectors 106A, 106B in at least some cases expose a gland connector for 3-15 mm diameter cable resistant to foreign material ingress according to Ingress Protection standard IP67.

FIG. 1B is a right side view of the smart sensor networking device 100 embodiment of FIG. 1A. The outer housing 102 and one of the twist lock connectors 106B is identified in the figure. Also identified in FIG. 1B is a multi-pin NEMA connector 108. In at least some embodiments the multi-pin NEMA connector 108 is compatible with an ANSI C136 standard promulgated by the National Electrical Manufacturers Association (NEMA). The multi-pin NEMA connector 108 may be compatible with the standard referred to as ANSI C136.41, ANSI C136.41-2013, or some other standard. Alternatively, the multi-pin NEMA connector 108 may be implemented with some other connector useful for external locking type photo-control devices for street and area lighting.

Figure 1C:
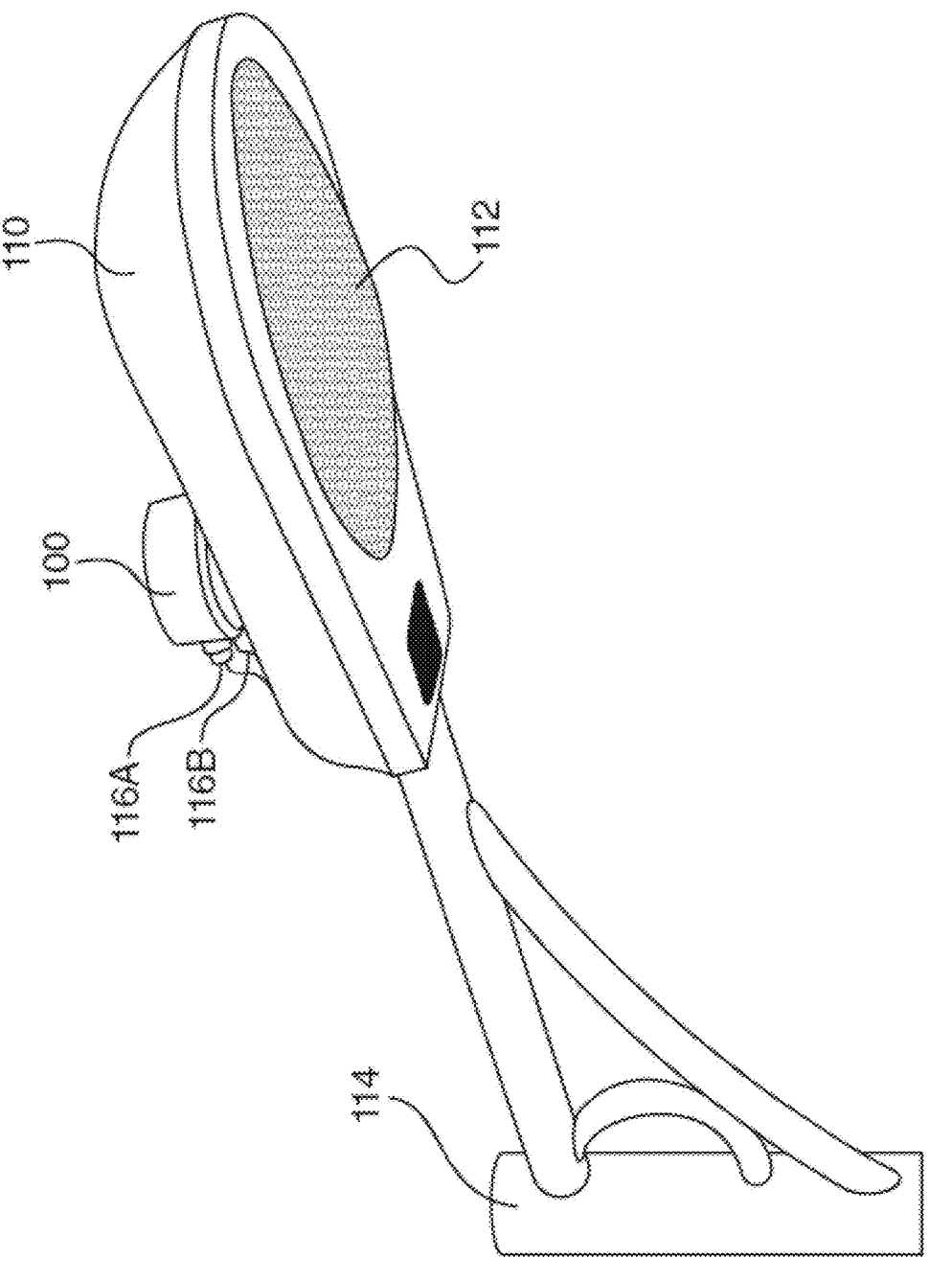
FIG. 1C is the smart sensor networking device embodiment of FIG. 1A mounted on a light fixture, which itself is coupled to a light pole.

FIG. 1C is the smart sensor networking device 100 mounted on a light fixture 110, which itself is coupled to a light pole 114. The light fixture 110 includes a light source 112. The light source 112 may be an incandescent light source, a light emitting diode (LED) light source, a high pressure sodium lamp, or any other type of light source. In the street light of FIG. 1C, the smart sensor networking device 100 is coupled to the light fixture 110 via the multi-pin NEMA connector 108. That is, the pins of the multi-ping NEMA connector 108 are electromechanically coupled to a compatible NEMA socket integrated into the light fixture 110. In some cases, the smart sensor networking device 100 replaces or otherwise takes the place of a different light sensor device, which does not have the features provided by the smart sensor networking device 100. Cables 116A, 116B are passed through the twist lock connectors 106A, 106B respectively of the smart sensor networking device 100. The cables 116A, 116B may be networking cables (e.g., Power over Ethernet (PoE)) cables, cables electrically coupled to other electronic circuits (e.g., cameras, transducers, weather devices, internet of things (IoT) devices, or any other type of device).

FIG. 2 is a smart sensor networking device 100 block diagram. In the embodiment, a processor module 140 includes an applications processor as well as other peripheral circuitry for the processor such as power circuitry, clock circuitry, memory control circuitry, and the like. The processor module 140 is communicatively coupled to a memory module 142. The memory module 142 includes memory of one or more types, which may be desirably partitioned into smart sensor networking device owner areas, one or more MINO areas, one or more municipality areas, one or more third-party areas, global areas, executable code areas, parameter areas, system areas, sensor areas, IoT areas, secure areas, unlicensed communication areas, licensed communication areas, and other areas as selected or otherwise implemented by one or more computing professionals.

The smart sensor networking device 100 includes one or more optional input/output modules 144 and one or more optional wired transceiver modules 146. The embodiment of FIG. 2 illustrates first cable 116A electromechanically coupled to an input/output module 144 and second cable 116B electromechanically coupled to wired transceiver module 146, but other embodiments are not so limited. As discussed herein, the modular design of the smart sensor networking device 100 permits any desirable arrangement of cables through the twist lock connectors 106A, 106B coupled to pass power, communications, control signals, or other information into, out from, or into and out from the smart sensor networking device 100.

The smart sensor networking device 100 may include at least one cellular-based gateway module 148A, which is a networking module arranged as a gateway to a cellular-based network. The cellular-based network is controlled by a mobile network operator (MNO). The cellular-based gateway module 148A enables functionality for a mobile device in proximity to the smart sensor networking device 100 to conduct a wireless communication session using the cellular-based network controlled by the MNO. The wireless communication session may be a cellular phone call, a short message service (e.g., text) message, an electronic mail, an internet session (e.g., delivery of multimedia information through a browser or other client software application on the mobile device), a tracking message, or any other type of communication that passes data over the MNO-controlled cellular-based network.

Optionally, the smart sensor networking device 100 includes a second cellular-based gateway module 148B, and any number of other cellular-based gateway modules 148N. By inclusion of multiple cellular-based gateways, the smart sensor networking device 100 enables a plurality of concurrent wireless communication sessions via the same or different MNO-controlled cellular-based networks.

Wireless communication sessions that are enabled through one or more cellular-based gateways 148A-148N may pass packetized data through one or more networking structures of the smart sensor networking device 100. In many cases, packetized data wirelessly received on the cellular-based network from at least one mobile device is communicated on or otherwise through a public switched telephone network (PSTN). The packetized data may be further communicated between the smart sensor networking device 100 and the PSTN in one or more ways. In some embodiments, the packetized data is passed through the same or another cellular-based gateway module 148A-148N to a cellular macrocell, to a landline, or to another smart sensor networking device 100. In some embodiments, the packetized data is passed through a wired transceiver module 146 (e.g., PoE, digital subscriber line (DSL), broadband cable, or the like) and a cable 116A, 116B to another computing device. In some embodiments, the packetized data is passed through a different cabled transceiver and cable 116A, 116B such as a fiber optic transceiver and cable medium. In still other cases, the packetized data is optionally passed through a wireless transceiver module 150, which may be a WiFi (e.g., IEEE 802.11) transceiver or a different type of wireless transceiver (e.g., licensed RF, unlicensed RF, satellite) that communicates according to a different protocol (e.g., a proprietary protocol, a satellite protocol, or some other protocol).

Operations of the one or more cellular-based gateways 148A-148N may be directed by a cellular-based parameter control module 150. In some cases, the cellular-based parameter control module 150 includes features that enable a smart sensor networking device 100 systems integrator or some other party to provision the smart sensor networking device 100 on a cellular-based network of a selected MNO. In this way, the MNO can itself provision each smart sensor networking device 100 for operation on the cellular-based network it controls, or the MNO can authorized another entity to provision the smart sensor networking device 100. The feature set provided by the cellular-based parameter control module 150 promote efficiency, cost-effectiveness, rapid-deployment, temporary deployment, one or more revenue models, and many other benefits.

The smart sensor networking device 100 may include antennas 152A-152N. For example, if the smart sensor networking device 100 includes a first cellular-based gateway module 148A, an antenna 152A may be coupled to the first cellular-based gateway module 148A, for example, by a cable or wire. Additionally or alternatively, if the smart sensor networking device 100 includes a second cellular-based gateway module 148B, an antenna 152B may be coupled to the second cellular-based gateway module 148B, for example, by a cable or wire. Additionally or alternatively, if the smart sensor networking device 100 includes a first wireless transceiver module 156A, an antenna 152C may be coupled to the first wireless transceiver module 156A, for example, by a cable or wire. Additionally or alternatively, if the smart sensor networking device 100 includes a second wireless transceiver module 156B, an antenna 152D may be coupled to the second wireless transceiver module 156B, for example, by a cable or wire. Additionally or alternatively, if the smart sensor networking device 100 includes a GPS module 158, an antenna 152E may be coupled to the cellular-based gateway module 148A, for example, by a cable or wire. Additionally or alternatively, if the smart sensor networking device 100 includes an infrared transceiver module 164, an optical antenna 152F (e.g., a photodiode) may be coupled to infrared transceiver module 164, for example, by a cable or wire.

Each antenna may be physically formed, arranged, positioned, and oriented to advantageously provide favorable communication of data. In some cases, one or more antennas are arranged to communicate data on a cellular-based network. In some cases, one or more antennas provide signal-sniffing capabilities. In some cases, one or more antennas are arranged to wirelessly communicate data on a non-cellular, licensed or unlicensed frequency or frequency spectrum as the case may be. In some cases the radial design of the casted, small cell cover will be used to enhance antenna performance.

A light sensor interface module 154 is included in the smart sensor networking device 100. The light sensor interface module 154 may include or otherwise enable light sensor functionality for one or more light sources such as a streetlight arranged in a light fixture that is coupled to the smart sensor networking device 100. In some cases, the light sensor interface module 154 communicates with a light sensor module 104 (FIG. 1A). In other cases, a light sensor module 104 is integrated with the light sensor interface module 154. The processor of processor module 140 may direct the operations of a light source based on data generated or otherwise provided by the light sensor interface module 154. For example, when ambient light in proximity to the smart sensor networking device 100 reaches one or more lower threshold, the light source may be directed to turn on or otherwise increase its light output. Conversely, when the ambient light in proximity to the smart sensor networking device 100 reaches one or more upper thresholds, the light source may be directed to turn on or otherwise decrease its light output. In some cases, the processor intelligently directs the operation of an associated light source based on information received from any of the available transceivers. In this way, for example, when a first light source from a nearby light pole is undesirably reduced in intensity, a second light source in close proximity may be directed to increase its intensity. As another example, a municipality, law enforcement agency, third-party private entity, or some other entity may intelligently control light output from a plurality of light sources. The intelligent light control of a plurality of light sources may be used for safety, advertising, celebration, crowd control, or any number of other reasons. In at least one embodiment, the smart sensor networking device 100 wireless communicates its light sensor data to another smart device. In this embodiment or other embodiments, the smart sensor networking device 100 wirelessly receives light sensor data from one or more other smart devices.

The wireless transceiver module 156A may optionally provide wireless communication capability to any one or more devices having corresponding wireless transceivers. In some cases, for example, using functionality provided by the wireless transceiver module 156A, the smart sensor networking device 100 is arranged to operate as a WiFi access point. In this way, the smart sensor networking device 100 permits one or more mobile devices to access the Internet. Municipalities or other entities may make internet services available over a determined geographic area (e.g., a neighborhood, a city, an arena, a construction site, a campus, or the like) to remote mobile devices that are in proximity to any one of a plurality of smart sensor networking devices 100. For example, if many street light fixtures in a neighborhood or city are equipped with a smart sensor networking device 100, then WiFi service can be provided to a large number of users. What's more, based on seamless communication between a plurality of smart sensor networking devices 100, the WiFi service can be configured as a mesh that permits users to perceive constant internet connectivity even when the mobile device is in motion.

The wireless transceiver module 156B may optionally provide wireless communication capability to any of one or more devices having corresponding wireless transceivers. In some cases, for example, using functionality provided by the wireless transceiver module 156B, the smart sensor networking device 100 is arranged to operate as a Bluetooth access point. In this way, the smart sensor networking device 100 permits one or more mobile devices to communicate with the smart sensor networking device 100, for example, to access the Internet. The wireless transceiver module 156B may provide capabilities that are similar to the capabilities of the wireless transceiver module 156A described above. In one or more embodiments, the wireless transceiver module 156A and the wireless transceiver module 156B are included in the same integrated circuit.

A global positioning system (GPS) module 158 is arranged in the smart sensor networking device 100. The GPS module 158 is arranged to determine a location of the smart sensor networking device 100, for example, using signals received from GPS satellites. The GPS module 158 permits the smart sensor networking device 100 to accurately report its position to another computing device. In some cases, the position may be used to positively identify the particular smart sensor networking device 100. In some cases, the position may be used to expressly direct service personnel to the site where the smart sensor networking device 100 is installed. The position information can be used diagnostically when a light source is failing, when an IoT device or some other sensor reports any type of information, and for other reasons. The highly accurate time-base of the GPS module may also be used by the smart sensor networking device 100 for weather data, almanac data, signal triangulation with other smart sensor networking devices 100, or for other purposes.

In some cases, an optional identity module 160 is arranged in the smart sensor networking device 100. The identity module 160 may include electronic, mechanical, or electromechanical switch circuitry, memory, a random number, a random number generator, a system-wide unique identifier, a world-wide unique identifier, or other such information. When combined with position information from the GPS module 158, the smart sensor networking device 100 may be able to more accurately report its identity and position to another computing device. The identity information can be used diagnostically and for other reasons. In at least some cases, identity information provided by an identity module is used as a network identifier for the smart sensor networking device 100. The identity information may be arranged as a 32-bit number, a 64-bit number, another number having a structurally preferable bit-width, a combination of information that further conveys information about the capabilities of the smart sensor networking device 100 (e.g., date of deployment, year of deployment, hardware version number, software version number, geographic location, or other such information).

A security module 162 is also optionally included in some embodiments of a smart sensor networking device 100. The security module 162 may include one or more of an encryption engine, a decryption engine, a random number generator, a secure memory, a separate processing device, and the like.

An infrared transceiver module 164 is also optionally included in some embodiments of a smart sensor networking device 100. The infrared transceiver module 164 is arranged to transmit and receive infrared signals. For example, the infrared transceiver module 164 conforms to the Infrared Data Association (IRDA) standard.

One or more sensor 166 is also optionally included in some embodiments of a smart sensor networking device 100. The sensor 166 outputs to the processor module 140 signals indicative of events detected by the sensor 166. For example, the sensor 166 is a microphone that outputs signals indicative of respective levels of sounds detected by the microphone. As set forth below, the processor module 140 may process the signals received from the microphone to determine the location of a gun that was recently fired. By way of another example, the sensor 166 is a temperature sensor that outputs signals indicative of respective temperatures detected by the temperature sensor. By way of still another example, the sensor 166 is a wind speed sensor that outputs signals indicative of the speeds of respective winds detected by the wind speed sensor. By way of yet another example, the sensor 166 is a seismic sensor that outputs signals indicative of respective levels of vibration detected by the seismic sensor. Of course the sensor 166 may be any other type of sensor or detector that is capable of detecting events of interest to a user of the smart sensor networking device 100.

As discussed herein, many of the components shown in FIG. 2 are optional. Accordingly, a smart sensor networking device 100 may be configured in a number of different ways depending on the anticipated use and location of the smart sensor networking device 100. For example, a smart sensor networking device 100 may include a cellular-based gateway module 148A or a wireless transceiver module 156A or a wired transceiver module 146 or an infrared transceiver module 164, or any combination thereof, by which distributed computing tasks are received and corresponding results are transmitted.

Figure 3:
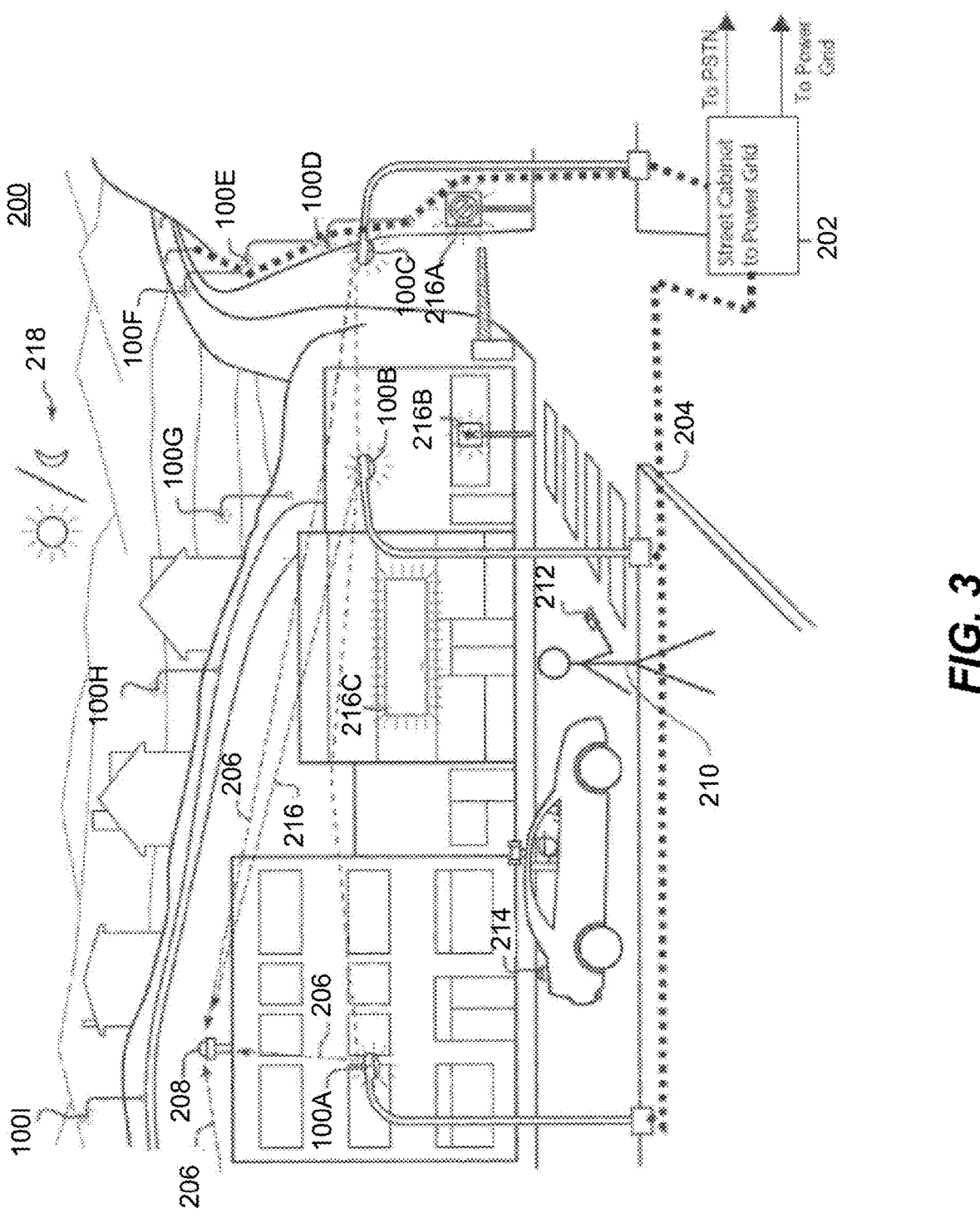
FIG. 3 is a system level deployment having a plurality of smart sensor networking devices coupled to streetlight fixtures.

FIG. 3 is a system level deployment 200 having a plurality of network devices coupled to streetlight fixtures. The streetlight fixtures are coupled to or otherwise arranged as part of a system of streetlight poles, each streetlight fixture includes a light source. Each light source, light fixture, and light fitting, individually or along with their related components, may in some cases be interchangeably referred to as a luminaire, a light source, a streetlight, a streetlamp, or some other such suitable term.

As shown in the system level deployment 200, a plurality of light poles are arranged in one or more determined geographic areas, and each light pole has at least one light source positioned in a fixture. The fixture is at least twenty feet above ground level and in at least some cases, the fixtures are between about 20 feet and 40 feet above ground level. In other cases, the streetlight fixtures may of course be lower than 20 feet above the ground or higher than 40 feet above the ground. In other system level deployments according to the present disclosure, there may be 1,000 or more light poles are arranged in one or more determined geographic areas. In these or in still other cases, the streetlight fixtures 102 may of course be lower than 20 feet above the ground or higher than 40 feet above the ground. Although described as being above the ground, streetlight fixtures shown and contemplated in the present disclosure may also be subterranean, but positioned above the floor, such as in a tunnel.

The system of streetlight poles, streetlight fixtures, streetlight sources, or the like in the system level deployment may be controlled by a municipality or other government agency. In other cases, the system streetlight poles, streetlight fixtures, streetlight sources, or the like in the system level deployment is controlled by a private entity (e.g., private property owner, third-party service contractor, or the like). In still other cases, a plurality of entities share control of the system of streetlight poles, streetlight fixtures, streetlight sources, or the like. The shared control may be hierarchical or cooperative in some other fashion. For example, when the system is controlled by a municipality or a department of transportation, an emergency services agency (e.g., law enforcement, medical services, fire services) may be able to request or otherwise take control of the system. In still other cases, one or more sub-parts of the system of streetlight poles, streetlight fixtures, streetlight sources, or the like can be granted some control such as in a neighborhood, around a hospital or fire department, in a construction area, or in some other manner.

In the system level deployment 200 of FIG. 3, any number of streetlight fixtures may be arranged with a connector that is compliant with a roadway area lighting standard promoted by a standards body. The connector permits the controlling or servicing authority of the system to competitively and efficiently purchase and install light sensors on each streetlight fixture. In addition, or in the alternative, the standardized connector in each streetlight fixture permits the controlling or servicing authority to replace conventional light sensors with other devices such as a smart sensor networking device 100, a smart sensor device, or some other device.

In the system level deployment 200, a plurality of smart sensor networking devices 100A-100I is provided, each of which is electromechanically coupled to a selected light pole wherein the electromechanical coupling is performed via the connector that is compliant with the roadway area lighting standard promoted by a standards body. Each of the smart sensor networking devices 100A-100C includes, among other things, a cellular-based gateway module 148A. Each of the smart sensor networking devices 100D-100F includes, among other things, a wireless transceiver module 156A. The smart sensor networking device 100G includes, among other things, a wired transceiver module 146 and a wireless transceiver module 156A. The smart sensor networking device 100H includes, among other things, a wired transceiver module 146 and an infrared transceiver module 164. The smart sensor networking device 100I includes, among other things, an infrared transceiver module 164. The wireless transceiver module 156A in each of the smart sensor networking devices 100D-100G is arranged to perform WiFi communications and interconnect to create a wireless local area network (WLAN) mesh network, for example, based on the IEEE 802.11s standard, ZigBee, DigiMesh, or Thread.

The processor-based light control circuit of each smart device is arranged to provide a light control signal to the respective light source based on at least one ambient light signal generated by its associated light sensor. In addition, because each smart sensor networking devices 100A-100I is equipped with communication capabilities, each light source in each streetlight can be controlled remotely as an independent light source or in combination with other light sources. In these cases, each of the plurality of light poles and fixtures with the mart sensor networking devices 100A-100I is communicatively coupled. The communicative relationship from each of the plurality of light poles and fixtures with one of the sensor networking devices 100A-100I may be a direct communication or an indirect communication. That is, in some cases, one of the sensor networking devices 100A-100I may communicate directly with another one the sensor networking devices 100A-100I or may communicate indirectly via yet another one of the sensor networking devices 100A-100I.

In the system level deployment 200 of FIG. 3, various ones of the light poles may be 50 feet apart, 100 feet apart, 250 feet apart, or some other distance. In some cases, the type and performance characteristics of each of the smart sensor networking devices 100A-100I are selected based on their respective distance to other such devices such that wireless communications are acceptable.

Each light pole and fixture with one of the smart sensor networking devices 100A-100C is coupled to a street cabinet 202 or other like structure that provides utility power (e.g., "the power grid") in a wired way. The utility power may provide 120 VAC, 240 VAC, 260 VAC, or some other power source voltage. In addition, optionally one or more of the light poles and fixtures with the smart sensor networking devices 100D-100I, is also coupled to the same street cabinet 202 or another structure via a wired backhaul connection. It is understood that these wired connections are in some cases separate wired connections (e.g., copper wire, fiber optic cable, industrial Ethernet cable, or the like) and in some cases combined wired connections (e.g., power over Ethernet (PoE), powerline communications, or the like). For simplification of the system level deployment 200 of FIG. 3, a wired backhaul and power line 204 is illustrated as a single line. The street cabinet 202 is coupled to the power grid, which is administered by a licensed power utility agency, and the street cabinet 202 is coupled to the public switched telephone network (PSTN).

Each light pole and fixture with one of the smart sensor networking devices 100A-100I in direct or indirect wireless communication with a light pole and fixture with another one of the smart sensor networking devices 100A-100I. In addition, each light pole and fixture with one of the smart sensor networking devices 100A-100C may also be in direct or indirect wireless communication 206 with an optional remote computing device 208. The remote computing device 208 may be controlled by an MNO, a municipality, another government agency, a third party, or some other entity. By this optional arrangement, the remote computing device can be arranged to wirelessly communicate light control signals and any other information (e.g., packetized data) between itself and each respective wireless smart sensor networking device coupled to any of the plurality of light poles.

A user 210 holding a mobile device 212 is represented in the system level deployment 200 of FIG. 3. A vehicle having an in-vehicle mobile device 214 is also represented. The vehicle may be an emergency service vehicle, a passenger vehicle, a commercial vehicle, a public transportation vehicle, a drone, or some other type of vehicle. The user 210 may use their mobile device 212 to establish a wireless communication session over a cellular-based network controlled by an MNO, wherein packetized wireless data is passed through the light pole and fixture with one of the smart sensor networking devices 100A-100C. Concurrently, the in-vehicle mobile device 214 may also establish a wireless communication session over the same or a different cellular-based network controlled by the same or a different MNO, wherein packetized wireless data of the second session is also passed through the light pole and fixture with one of the smart sensor networking devices 100A-100C.

Other devices may also communicate through light pole-based devices of the system level deployment 200. These devices may be internet of things (IoT) devices or some other types of devices. In FIG. 3, two public information signs 216A, 216B, and a private entity sign 216C are shown, but many other types of devices are contemplated. Each one of these devices may form an unlicensed wireless communication session (e.g., WiFi) or a cellular-based wireless communication session with one or more wireless networks made available by the devices shown in the system level deployment 200 of FIG. 3.

The sun and moon 218 are shown in FIG. 3. Light or the absence of light based on time of day, weather, geography, or other causes provide information (e.g., ambient light) to the light sensors of the light pole mounted devices described in the present disclosure. Based on this information, the associated light sources may be suitably controlled.

FIG. 4 is a flowchart 300 showing some operations of a system that deploys a plurality of smart sensor networking devices 100 coupled to a plurality of streetlight fixtures. Processing begins at 302.

At 304, a plurality of distributed computing tasks is obtained. For example, the remote computing device 208 shown in FIG. 3 obtains the distributed computing tasks from a governmental, educational, or commercial enterprise that has paid a fee for distributed computing services to the owner or operator of the smart sensor networking devices 100A-100C. The distributed computing tasks may relate to computations that are to be performed during cryptocurrency (e.g., Bitcoin) mining, block chain or other distributed ledger transaction validation, search for extraterrestrial intelligence (SETI) signal analysis, weather forecasting, or other big-data analysis, for example.

Processing continues to 306 where each of the distributed computing tasks obtained at 304 is assigned to one of a plurality of smart sensor networking devices. For example, the remote computing device 208 assigns the distributed computing tasks to each of the smart sensor networking devices 100A-100I shown in FIG. 3. Each distributed computing task may include a formula or algorithm (or an identifier that uniquely identifies a formula or algorithm) and parameter values that are to be used in the formula or algorithm during one or more computations. Each distributed computing task may be included in a packet or other suitable data structure along with an identifier of the particular one of the smart sensor networking devices 100A-100I to which the distributed computing task has been assigned. The identifiers may be media access control (MAC) addresses, Internet Protocol (IP) addresses, for example, or other identifiers that uniquely identify each of the smart sensor networking devices 100A-100I.

Processing continues to 308 where the distributed computing tasks assigned at 306 are transmitted to the smart sensor networking devices 100A-100I. For example, the remote computing device 208 transmits the distributed computing tasks to the smart sensor networking devices 100A-100I. The smart sensor networking devices 100A-100I may perform routing of data packets containing the distributed computing tasks, for example, over a mesh network.

For example, the remote computing device 208 may transmit a distributed computing task that is addressed to the smart sensor networking device 100I over a cellular network to the smart sensor networking device 100C. Based on the address of the smart sensor networking device 100I included in the packet, the smart sensor networking device 100C may route the packet to the smart sensor networking device 100D over a WiFi network. Based on the address of the smart sensor networking device 100I included in the packet, the smart sensor networking device 100D may route the packet to the smart sensor networking device 100G over a WiFi network. Based on the address of the smart sensor networking device 100I included in the packet, the smart sensor networking device 100G may route the packet to the smart sensor networking device 100H over a powerline. Based on the address of the smart sensor networking device 100I included in the packet, the smart sensor networking device 100H may route the packet to the smart sensor networking device 100I using infrared-based communications.

Processing continues to 310 where one of the distributed computing tasks transmitted at 308 is received at each of the assigned smart sensor networking devices. For example, one of the distributed computing tasks transmitted at 308 is received at each of the smart sensor networking devices 100A-100I.

Processing continues to 312 where a distributed computing result is obtained based on a distributed computing task, at each of the assigned smart sensor networking devices. For example, the memory 142 of each of the smart sensor networking devices 100A-100I includes processor-readable instructions that, when executed by the processor module 140, causes the smart sensor networking device to perform a series of computations using data included in the distributed computing task assigned thereto. The processor-readable instructions may be configured such that each smart sensor networking devices obtains a distributed computing result only if the processor module 140 is not busy performing other tasks that have a higher priority, such as tasks associated with operation of a small cell or a WiFi access point. For example, the processor module 140 obtains a distributed computing result based on a distributed computing task in response to determining that a utilization of the processor module 140 is below a threshold utilization value (e.g., 0, 5%, 10%, 20%, or some other threshold value).

Processing continues to 314 where a distributed computing result is transmitted from each of the assigned smart sensor networking devices that obtained a distributed computing result at 312. For example, each of the smart sensor networking devices 100A-100I transmits a distributed computing result to the remote computing device 208. The smart sensor networking devices 100A-100I may perform routing of data packets containing the distributed computing results, for example, over a mesh network.

Processing continues to 316 where a distributed computing result is received from each of the assigned smart sensor networking devices that transmitted a distributed computing result at 314. For example, the remote computing device 208 receives a distributed computing result from each of the smart sensor networking devices 100A-100I.

Processing continues to 318 where the distributed computing result received from each of the assigned smart sensor networking devices is further processed. For example, the remote computing device 208 sums the distributed computing results received from each of the smart sensor networking devices 100A-100I to obtain a final result.

Processing at 318 continues and does not end. That is, the system as deployed may continue to operate in perpetuity without ending. Various ones of the smart sensor networking devices may be introduced to the system, removed from the system, repositioned within the system, or reconfigured in any number of ways. Parameters of each device may be changed to alter the operating characteristics of any of the devices. Control of the parameters may be performed locally or remotely, manually or automatically.

Figure 5:
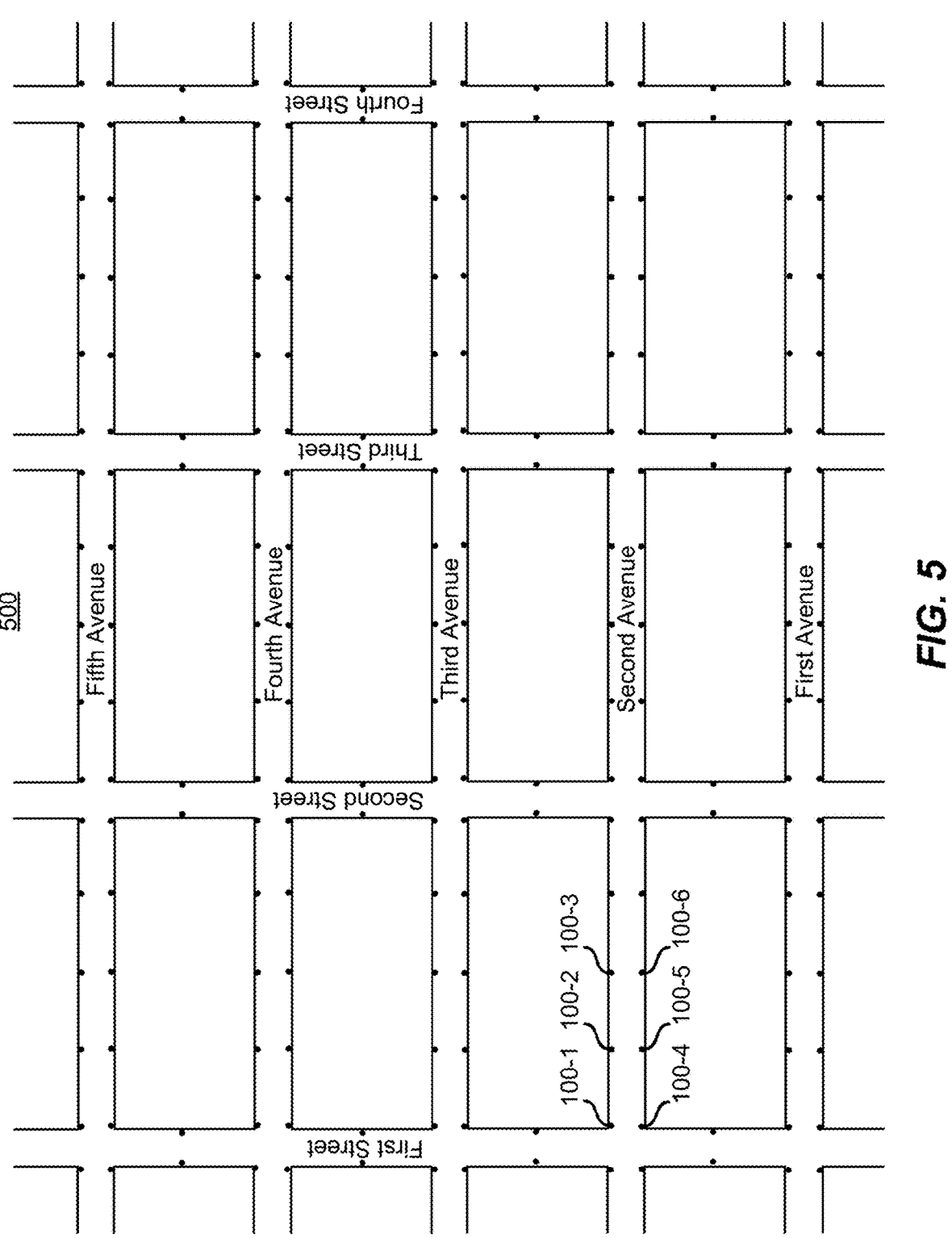
FIG. 5 is a system level deployment having a plurality of smart sensor networking devices.

FIG. 5 is a system level deployment 500 having a plurality of smart sensor networking devices 100, according to one or more embodiments of the present disclosure. The system level deployment 500 includes one hundred and twelve (112) smart sensor networking devices 100, each of which is represented by a black dot in FIG. 5. For illustrative simplicity, only smart sensor networking devices 100-1, 100-2, 100-3, 100-4, 100-5, and 100-6 are labeled in FIG. 5. Each of the smart sensor networking devices 100 is mounted to a light fixture that is located on a light pole, for example, in a manner similar to that shown in FIG. 1C. Multiple groups of the smart sensor networking devices 100 cooperate to perform various tasks, as described more fully below.

In a first example, each of the smart sensor networking devices 100 includes a sensor 166 that is a microphone. Additionally, the processor module 140 of each of the smart sensor networking devices 100 is programmed to transmit a message to one or more of the smart sensor networking devices 100-1, 100-2, 100-3, 100-4, 100-5, and 100-6 each time that a sound having characteristic of a gunshot (e.g., having a sound level greater than or equal to a predetermined threshold value) is detected. The message includes an identifier of the smart sensor networking device 100 that detected the sound, a time which the sound was detected, and possibly a location of the smart sensor networking device 100. The smart sensor networking devices 100-1, 100-2, 100-3, 100-4, 100-5, and 100-6 process different ones of the messages using time difference of arrival techniques to determine the location at which a gun was fired. The smart sensor networking device 100-1, for example, may obtain a final result by aggregating partial results obtained by the smart sensor networking devices 100-2, 100-3, 100-4, 100-5, and 100-6.

The smart sensor networking device 100-1 may take various actions based on the final result. For example, if the location at which the gun was fired is determined to be on First Avenue between Second Street and Third Street, the smart sensor networking device 100-1 may send one or more messages to the smart sensor networking devices 100 located on First Avenue between Second Street and Third Street. The one or more messages may cause the processor module 140 of the smart sensor networking devices 100 located on First Avenue between Second Street and Third Street to generate control signals that cause the lights in the light fixtures coupled thereto to change brightness or color. For example, the one or more messages cause all of the smart sensor networking devices 100 located on First Avenue between Second Street and Third Street to output control signals to the lights in the light fixtures coupled thereto to become brighter. Also, the one or more messages may cause the smart sensor networking devices 100 that is closest to the detected location at which the gun was fired to output a control signal to the light in the light fixture coupled thereto that causes the light to blink or change color, to indicate the location at which the gun was fired to people in the vicinity, for example, law enforcement personnel or civilians.

In a second example, each of the smart sensor networking devices 100 includes a wireless transceiver module 156B that is arranged to operate as a Bluetooth access point that transmits beacon signals. Additionally, the computing module 140 of each of the smart sensor networking devices 100 is programmed to transmit a message to one or more of the smart sensor networking devices 100-1, 100-2, 100-3, 100-4, 100-5, and 100-6 each time that a response signal to the beacon signal is received by the wireless transceiver module 156B. The message includes an identifier of the smart sensor networking device 100 that detected the response signal, a time which the response signal was detected, an address of a device that transmitted the response signal, and possibly a location of the smart sensor networking device 100. The smart sensor networking devices 100-1, 100-2, 100-3, 100-4, 100-5, and 100-6 process different ones of the messages using time difference of arrival techniques to determine the location of a device that transmitted the response signal. The smart sensor networking device 100-1, for example, may obtain a final result by aggregating partial results obtained by the smart sensor networking devices 100-2, 100-3, 100-4, 100-5, and 100-6.

The smart sensor networking device 100-1 may take various actions based on the final result. For example, the smart sensor networking device 100-1 may store one or more addresses of devices used by emergency personnel (e.g., police, fire, or paramedics) that are currently responding to an emergency. If smart sensor networking device 100-1 determines that one of those devices is responding to the beacons that are being transmitted, the smart sensor networking device 100-1 may send one or more messages to a smart sensor networking device 100 located closest to the determined location a device used by emergency personnel. The one or more messages may cause the smart sensor networking device 100 located closest to the device used by emergency personnel to output a control signal that causes the light in the light fixture coupled thereto to become brighter so that the emergency personnel will be able to more easily see things in the vicinity. Also, the one or more messages may cause the smart sensor networking device 100 located closest to the device used by emergency personnel to output a control signal that causes the light in a fixture coupled thereto to change color and/or blink, for example, so that a police officer can more easily locate a fire fighter responding to a fire.

Additionally, the smart sensor networking device 100-1 may track the locations of the devices used by emergency personnel. For example, if the smart sensor networking device 100-1 determines that a device used by emergency personnel is moving east on Fourth Avenue, the smart sensor networking device 100-1 may send one or more messages to the smart sensor networking devices 100 located on Fourth Avenue at a location where the device is or will soon be to become brighter, change color, and/or blink so that the emergency personnel can see better and/or so that others in the vicinity are alerted to the presence of the emergency personnel in the area.

Figure 6:
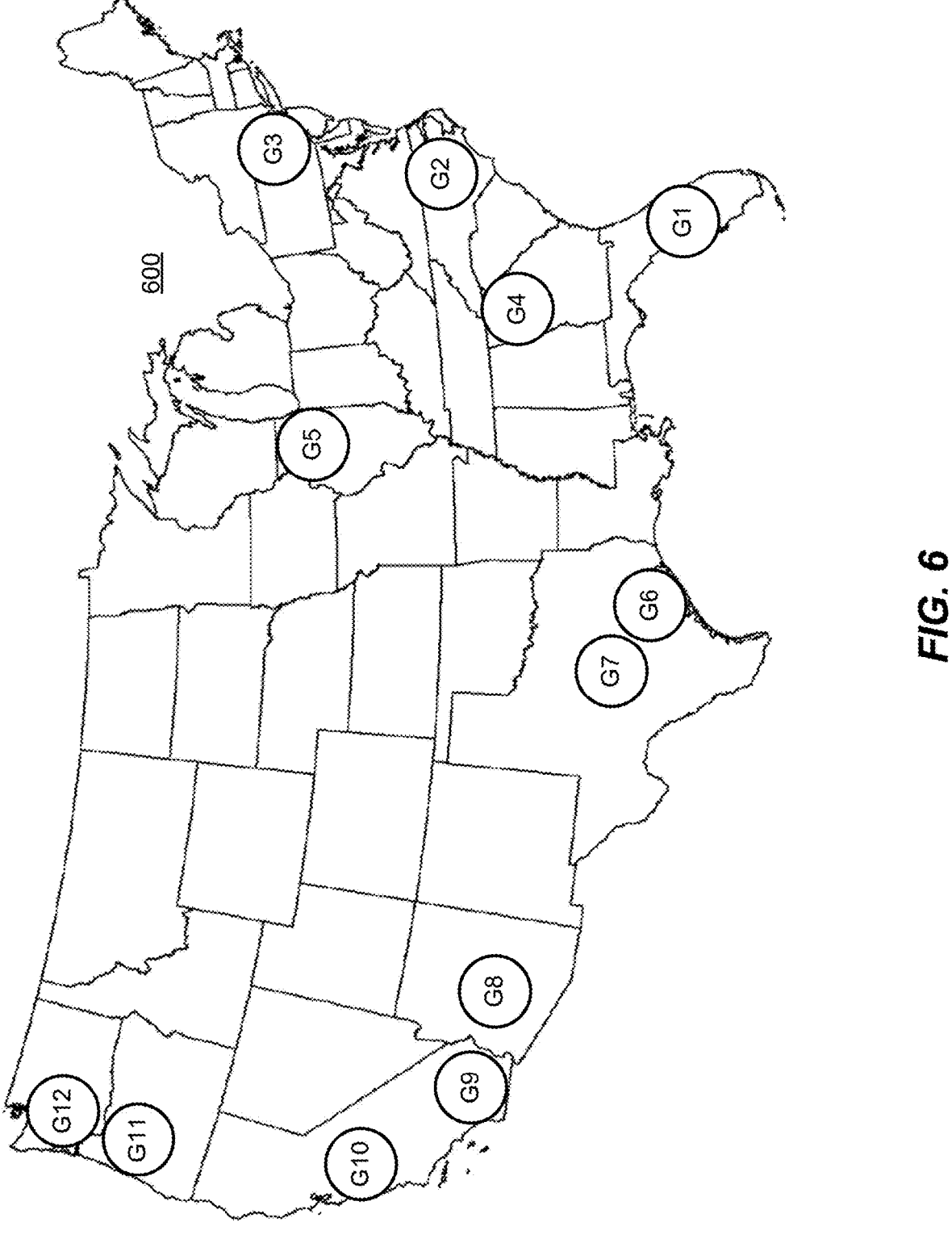
FIG. 6 is another system level deployment having a plurality of groups of smart sensor networking devices.

FIG. 6 is another system level deployment 600 having a plurality of groups of smart sensor networking devices 100, according to one or more embodiments of the present disclosure. The system level deployment 600 includes twelve (12) groups G1-G12 of the smart sensor networking devices 100. For example, each of the groups G1-G12 may include a plurality of smart sensor networking devices 100 similar to the ones included in the system level deployment 500 shown in FIG. 5. The system level deployment 600 shown in FIG. 6 is just an example; other system level deployments may include hundreds or thousands of groups, each including hundreds or thousands of smart sensor networking devices 100. In addition, although the groups G1-G12 are shown geographically distributed over the continental United States, the groups G1-G12 could be geographically distributed over a different country or could be geographically distributed over multiple countries.

In one example, a remote computing device (e.g., remote computing device 208) is in direct or indirect communication with a first smart sensor networking device 100 in the first group G1. The first smart sensor networking device 100 in the first group G1 generates or otherwise obtains a plurality of distributed computing tasks for processing a large volume of weather data. The first smart sensor networking device 100 in the first group G1 assigns the distributed computing tasks to other of the smart sensor networking devices 100 in the first group G1 and to smart sensor networking devices 100 in the other groups G2-G12. In addition, the first smart sensor networking device 100 in the first group G1 obtains corresponding distributed computing tasks from the other of the smart sensor networking devices 100 in the first group G1 and from the smart sensor networking devices 100 in the other groups G2-G12

In one or more embodiments, a hierarchy of the smart sensor networking device 100 is used to assign distributed computing tasks and to aggregate corresponding distributed computing results. For example, one or more of the smart sensor networking devices 100 in each of the groups G1-G12 is programmed to assign distributed computing tasks and to aggregate corresponding distributed computing tasks. The one or more of the smart sensor networking devices 100 in each of the groups G1-G12 may be predetermined. Alternatively, the smart sensor networking devices 100 in each of the groups G1-G12 may perform a process to dynamically select the one or more of the smart sensor networking devices 100 that assign distributed computing tasks and aggregate distributed computing results in that group, for example, based on location, current utilization level, and/or hardware capabilities (e.g., processor speed, size of memory) of the smart sensor networking devices 100. In either case, the first smart sensor networking device 100 in the first group G1 may assign a plurality of tasks to a first smart sensor networking device 100 in each of the groups G2-G12. The first smart sensor networking device 100 in each of the groups G2-G12 assigns the tasks to other of the smart sensor networking devices 100 in that group. In addition, the first smart sensor networking device 100 in each of the groups G2-G12 aggregates corresponding distributed computing results from the other of the smart sensor networking devices 100 in that group, and forwards the aggregated distributed computing results to the first smart sensor networking device 100 in the group G1. The first smart sensor networking device 100 in the group G1 furthers aggregates the distributed computing results from group G1 and the distributed computing from each groups G2-G12. The first smart sensor networking device 100 may perform additional processing on the aggregated distributed computing results to obtain a final result. Alternatively, the first smart sensor networking device 100 may transmit all of the distributed computing results to the remote computing device, which performs additional processing on the aggregated distributed computing results to obtain the final result. For example, the final result may be a weather forecast that is based on the processed weather data.

Having now set forth certain embodiments, further clarification of certain terms used herein may be helpful to providing a more complete understanding of that which is considered inventive in the present disclosure.

Mobile network operators (MNOs) provide wireless cellular-based services in accordance with one or more cellular-based technologies. As used in the present disclosure, "cellular-based" should be interpreted in a broad sense to include any of the variety of technologies that implement wireless or mobile communications. Exemplary cellular-based systems include, but are not limited to, time division multiple access ("TDMA") systems, code division multiple access ("CDMA") systems, and Global System for Mobile communications ("GSM") systems. Some others of these technologies are conventionally referred to as UMTS, WCDMA, 4G, 5G, and LTE. Still other cellular-based technologies are also known now or will be known in the future. The underlying cellular-based technologies are mentioned here for a clearer understanding of the present disclosure, but the inventive aspects discussed herein are not limited to any particular cellular-based technology.

In some cases, cellular-based voice traffic is treated as digital data. In such cases, the term "VoIP" may be used to mean any type of voice service that is provided over a data network, such as an Internet Protocol (IP) based network. The term VoIP is interpreted broadly to include any system wherein a voice signal from a mobile computing device is represented as a digital signal that travels over a data network. VoIP then may also include any system wherein a digital signal from a data network is delivered to a mobile computing device where it is later delivered as an audio signal.

Connector devices of the types described herein are also commonly referred to as NEMA devices, NEMA compatible devices, NEMA compliant devices, or the like. And these devices include receptacles, connectors, sockets, holders, components, etc. Hence, as used in the present disclosure and elsewhere, those of skill in the art will recognize that coupling the term "NEMA" or the term "ANSI" with any such device indicates a device or structure compliant with a standard promoted by a standards body such as NEMA, ANSI, IEEE, or the like.

A mobile device, or mobile computing device, as the terms are used interchangeably herein, is an electronic device provisioned by at least one mobile network operator (MNO) to communicate data through the MNOs cellular-based network. The data may be voice data, short message service (SMS) data, electronic mail, world-wide web or other information conventionally referred to as "internet traffic," or any other type of electromagnetically communicable information. The data may be digital data or analog data. The data may be packetized or non-packetized. The data may be formed or passed at a particular priority level, or the data may have no assigned priority level at all. A non-comprehensive, non-limiting list of mobile devices is provided to aid in understanding the bounds of the term, "mobile device," as used herein. Mobile devices (i.e., mobile computing devices) include cell phones, smart phones, flip phone, tablets, phablets, handheld computers, laptop computers, body-worn computers, and the like. Certain other electronic equipment in any form factor may also be referred to as a mobile device when this equipment is provisioned for cellular-based communication on an MNOs cellular-based network. Examples of this other electronic equipment include in-vehicle devices, medical devices, industrial equipment, retail sales equipment, wholesale sales equipment, utility monitoring equipment, and other such equipment used by private, public, government, and other entities.

Mobile devices further have a collection of input/output ports for passing data over short distances to and from the mobile device. For example, serial ports, USB ports, WiFi ports, Bluetooth ports, IEEE 1394 FireWire, and the like can communicatively couple the mobile device to other computing apparatuses.

Mobile devices have a battery or other power source, and they may or may not have a display. In many mobile devices, a signal strength indicator is prominently positioned on the display to provide network communication connectivity information to the mobile device user.

A cellular transceiver is used to couple the mobile device to other communication devices through the cellular-based communication network. In some cases, software and data in a file system are communicated between the mobile device and a computing server via the cellular transceiver. That is, bidirectional communication between a mobile device and a computing server is facilitated by the cellular transceiver. For example, a computing server may download a new or updated version of software to the mobile device over the cellular-based communication network. As another example, the mobile device may communicate any other data to the computing server over the cellular-based communication network.

Each mobile device client has electronic memory accessible by at least one processing unit within the device. The memory is programmed with software that directs the one or more processing units. Some of the software modules in the memory control the operation of the mobile device with respect to generation, collection, and distribution or other use of data. In some cases, software directs the collection of individual datums, and in other cases, software directs the collection of sets of data.

Software may include a fully executable software program, a simple configuration data file, a link to additional directions, or any combination of known software types.

When the computing server updates software, the update may be small or large. For example, in some cases, a computing server downloads a small configuration data file to as part of software, and in other cases, computing server completely replaces all of the present software on the mobile device with a fresh version. In some cases, software, data, or software and data is encrypted, encoded, and/or otherwise compressed for reasons that include security, privacy, data transfer speed, data cost, or the like.

Processing devices, or "processors," as described herein, include central processing units (CPU's), microprocessors, microcontrollers (MCU), digital signal processors (DSP), application specific integrated circuits (ASIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. A processor may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard coded as a state machine or set of control signals. According to methods and devices referenced herein, one or more embodiments describe software executable by the processor, which when executed, carries out one or more of the method acts.

As known by one skilled in the art, a computing device, including a mobile computing device, has one or more memories, and each memory may comprise any combination of volatile and non-volatile computer-readable media for reading and writing. Volatile computer-readable media includes, for example, random access memory (RAM). Non-volatile computer-readable media includes, for example, any one or more of read only memory (ROM), magnetic media such as a hard-disk, an optical disk, a flash memory device, a CD-ROM, and the like. In some cases, a particular memory is separated virtually or physically into separate areas, such as a first memory, a second memory, a third memory, etc. In these cases, it is understood that the different divisions of memory may be in different devices or embodied in a single memory. Some or all of the stored contents of a memory may include software instructions executable by a processing device to carry out one or more particular acts.

In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

As used in the present disclosure, the term "module" refers to an application specific integrated circuit (ASIC), an electronic circuit, a processor and a memory operative to execute one or more software or firmware programs, combinational logic circuitry, or other suitable components (hardware, software, or hardware and software) that provide the functionality described with respect to the module.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds or milliseconds), and that the activity may be performed on an ongoing basis (e.g., recording and reporting the collection of utility grade power metering data, recording and reporting IoT data, crowd control data, anomalous action data, and the like). An example of an activity that is not real-time is one that occurs over an extended period of time (e.g., hours or days) or that occurs based on intervention or direction by a person or other activity.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a small cell networking device may be described as being mounted "substantially horizontal," In these cases, a device that is mounted exactly horizontal is mounted along an "X" axis and a "Y" axis that is normal (i.e., 90 degrees or at right angle) to a plane or line formed by a "Z" axis. Different from the exact precision of the term, "horizontal," and the use of "substantially" or "about" to modify the characteristic permits a variance of the particular characteristic by up to 30 percent. As another example, a small cell networking device having a particular linear dimension of between about six (6) inches and twelve (12) inches includes such devices in which the linear dimension varies by up to 30 percent. Accordingly, the particular linear dimension of the small cell networking device may be between 2.4 inches and 15.6 inches.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" or "one or more embodiments" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/of" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As described herein, for simplicity, a user is in some case described in the context of the male gender. For example, the terms "his," "him," and the like may be used. It is understood that a user can be of any gender, and the terms "he," "his," and the like as used herein are to be interpreted broadly inclusive of all known gender definitions.

As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

When so arranged as described herein, each computing device may be transformed from a generic and unspecific computing device to a combination device comprising hardware and software configured for a specific and particular purpose. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

What is claimed is:

1. A distributed computing system comprising:
a plurality of streetlight-mountable networking devices, each of the plurality of networking devices being attached to a respective streetlight fixture and including:
a light sensor module that detects ambient light and outputs a light signal based thereon;

a communication module that receives a respective task assignment from a remote computing device and transmits a respective computing result to the remote computing device via a data communication network;

a processor module that provides a light control signal for controlling light output from the respective streetlight fixture based at least on the signal generated by the light sensor, performs a computing task responsive to receipt of the respective task assignment from the communication module, and communicates the respective computing result to the remote computing device via the communication module responsive to performing the computing task, wherein the computing task is at least one of a plurality of computing tasks performed in the distributed computing system and wherein the respective computing result is aggregated with computing results from one or more other networking devices of the plurality of networking devices by the remote computing device to produce a final result; and a connector arranged for electromechanical coupling to a compatible connector integrated with the streetlight fixture, wherein power for the communication module, the light sensor, and the processor module is passed via the connector.

2. The distributed computing system of claim 1, wherein the communication module is arranged to participate in a mesh network, receive the respective task assignment over the mesh network, and transmit the respective computing result over the mesh network.

3. The distributed computing system of claim 1, wherein the processor module is arranged to perform the computing task in response to determining that a utilization of the processor module is below a threshold value.

4. The distributed computing system of claim 1, wherein the communication module is arranged to receive the respective task assignment and to transmit the respective computing result using a cellular-based network.

5. The distributed computing system of claim 1, wherein the communication module is arranged to receive the respective task assignment and to transmit the respective computing result using wireless data communications.

6. The distributed computing system of claim 1, wherein the connector includes:

at least three pin structures, the at least three pin structures arranged for removable electromechanical coupling to the compatible connector of the streetlight fixture.

7. The distributed computing system of claim 1, wherein the final result is determined by the remote computing device based on the computing results communicated from the plurality of networking devices, and wherein the processor module provides the light control signal responsive to receiving a message from the remote computing device, the message being based on the final result.

8. A method performed by a streetlight-mountable networking device that includes a processor module, a light sensor, and a communication module, the networking device being one of a plurality of streetlight-mountable networking devices, the method comprising:

controlling, by the processor module, a light output of a streetlight fixture to which the networking device is electromechanically coupled based at least on a light signal generated by the light sensor;

receiving, by the processor module via the communication module, a task assignment from a remote computing device;

performing, by the processor module, a computing task responsive to receipt of the task assignment; and transmitting, by the processor module, a computing result to the remote computing device using the communication module responsive to performing the computing task, wherein the computing task is at least one of a plurality of computing tasks performed in a distributed computing environment and wherein the computing result is for aggregation by the remote computing device with computing results from one or more other streetlight-mountable networking devices of the plurality of networking devices to produce a final result.

9. The method of claim 8, further comprising:

receiving, from the remote computing device via the communication module, a message, the message being based on the final result; and controlling, by the processor module, a light output of the streetlight fixture based on the message.

10. The method of claim 8, further comprising:

prior to performing the computing task, determining, by the processor module, whether the processor module is busy performing other higher priority tasks, wherein the computing task is performed only if the processor module is not busy performing other higher priority tasks.

11. The distributed computing system of claim 1, wherein the communication module is further arranged to receive a message generated based on the final result, and the processor module is further arranged to provide the light control signal based on the message.

12. The method of claim 10, further comprising:

determining, by the processor module, that the processor module is not busy performing other higher priority tasks when a utilization of the processor module is below a threshold utilization value.

* * * * *